United States Patent
Gudmand-Hoyer

[15] 3,683,215
[45] Aug. 8, 1972

[54] METHOD AND AN APPARATUS FOR THE PRODUCTION OF HEAT AND PRESSURE ENERGY

[72] Inventor: Mita Maria Gudmand-Hoyer, Ballerup, Denmark

[73] Assignee: Dan-Fire-Energy ved Mita Gudmand-Hoyer, Ballerup, Denmark

[22] Filed: March 15, 1971

[21] Appl. No.: 124,568

[30] Foreign Application Priority Data

March 16, 1970 Denmark .......................1296

[52] U.S. Cl.....................310/11, 431/4, 60/39.82 N
[51] Int. Cl................................................H02n 4/00
[58] Field of Search ........310/11; 431/4, 5; 60/39.05, 60/39.06, 39.55, 39.65

[56] References Cited

UNITED STATES PATENTS

| | | | |
|---|---|---|---|
| 1,755,846 | 4/1930 | Steed | 60/39.82 X |
| 2,632,300 | 3/1953 | Brzozowski | 60/39.82 N |
| 3,255,802 | 6/1966 | Browning | 431/4 |

*Primary Examiner*—D. X. Sliney
*Attorney*—Imirie & Smiley

[57] ABSTRACT

A method for the production of heat- and pressure-energy, by the use of a burner having a refractory perforated screen that on one side is contacted by the secondary air and on the other side by the primary combustion air, together with the ignited fuel, and an apparatus for carrying out the method, and more specifically to a magnetohydro-dynamic generator, for the production of electricity.

9 Claims, 1 Drawing Figure

PATENTED AUG 8 1972
3,683,215
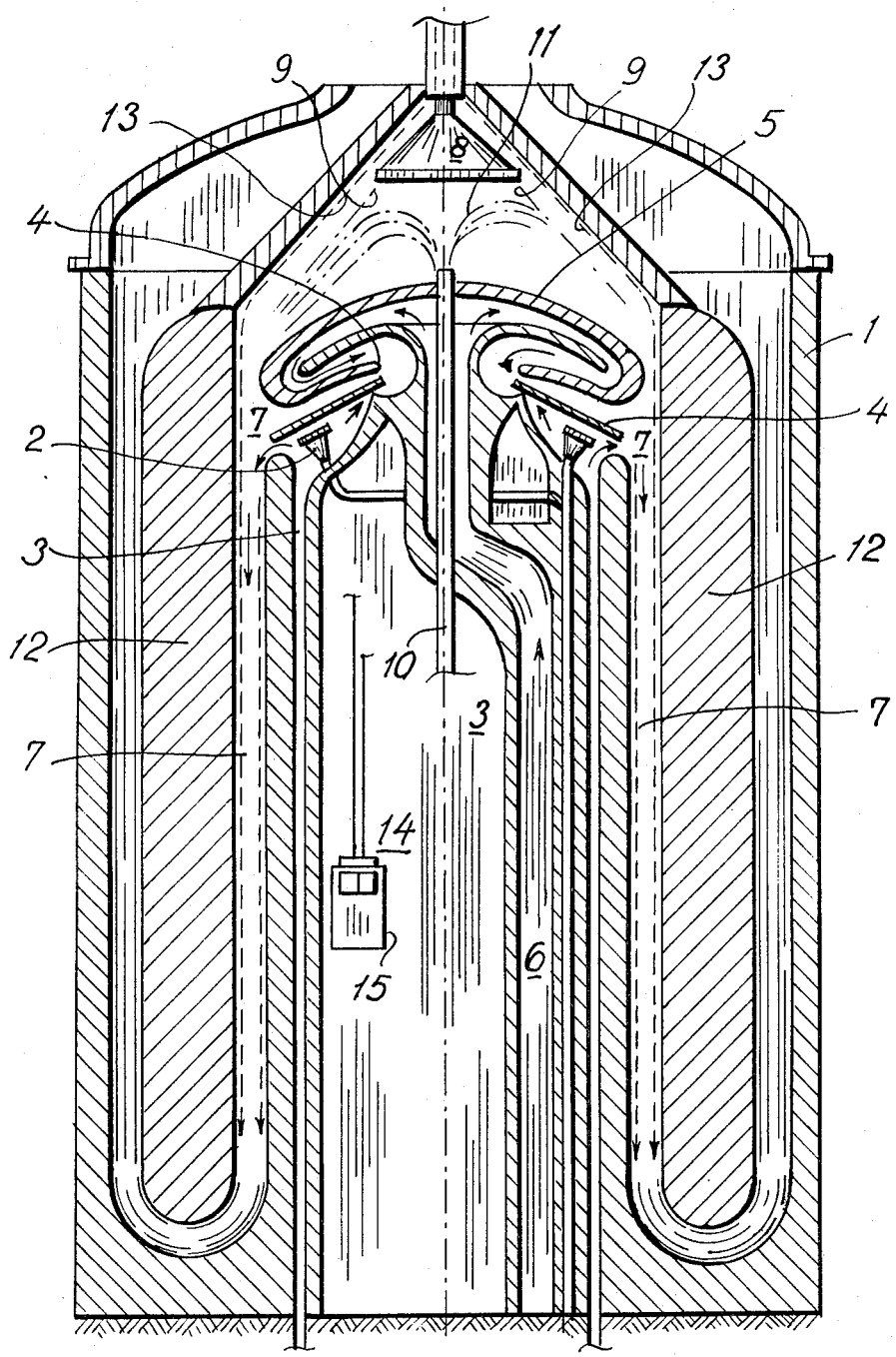
INVENTOR
MITA MARIA GUDMAND-HØYER
BY Imirie & Smiley
Attys.

METHOD AND AN APPARATUS FOR THE PRODUCTION OF HEAT AND PRESSURE ENERGY

The object of the invention is to provide a method and an apparatus for producing a great amount of energy in a manner that is cheap, and not dangerous, and by using a comparatively small amount of fuel.

The developed heat-energy can be used in several ways, e.g., to produce steam in a boiler, or it can be used in other heat and pressure consuming aggregates, or to produce electricity by magnetohydrodynamic action, through the use of a magnetohydrodynamic generator.

The burners used are of the type mentioned in the specification of the Danish patent No. 113,942. These burners insure a complete and clean combustion under the best possible utilization of the heat-energy of the fuel, with a very sharply bounded annular flame of high temperature.

An essential feature of the invention is that the annular flame and its combustion gases are directed into a channel having an annular cross-section, and along the outer circumferential wall of which there is added a fast-moving gaseous stream, consisting of a medium containing substances for increasing the energy of the combustion.

The high temperature of the flame acts as an initiator of a chemical process in which the added energy-increasing substances are involved. Hereby is obtained a considerable increase of the developed energy.

As added energy-increasing substances, various kinds of salts and oils, or sea water, or simply polluted water, may be used, these substances containing components which are able to burn, or to participate in other exothermic chemical processes.

Sea water contains great quantities of energy-increasing substances in the form of salts, hydrogen and deuterium, and polluted water includes, moreover, comminuted inflammable substances, such as carbons, fatty substances, salts and many others. As a result of the complete and clean combustion, with a comparatively little amount of fuel, the pollution of the atmosphere will be diminished and the above-mentioned use of water, such as polluted water, as an energy-increasing substance will assist in counteracting the constant increase of the pollution of the air and of our drinking water, rivers, lakes, and seas.

Furthermore, the apparatus according to the invention, is advantageous because it works without the use of cooling water, other than that added to the combustion.

Together with the energy-increasing substance, there may, if necessary, be added a neutralizing agent such as lime that can neutralize the effect of any admixed poison in the energy-increasing substance.

Further, an ionizing metal may be added which is of importance when the apparatus according to the invention is put to use as a magneto-hydrodynamic generator for the special purpose of producing electricity.

Ionization in such a generator is brought about first and foremost by the highly energetic friction between the outer stratum of the very hot fast moving gas stream and the cold protection air that is introduced along the vertical magnet surfaces of the magnetohydrodynamic generator, to protect these against the very hot gas stream.

Ionization can furthermore be promoted by producing a shockwave motion in the introduced energy-increasing substance, or in a neutralizing substance in the form of a gas, if convenient, in conjunction with steam.

A magnetohydrodynamic generator of this type is based on the fact that when a fast-moving stream of ionized gases is passing through a magnetic field, the ions will be deflected in a direction perpendicular to the magnetic field and to the direction of the movement of the gas, and an electric current may be taken out through electrodes that are mounted in the ionized gas stream.

The apparatus according to the invention may alternatively be formed as an oil or gas burning boiler, or furnace. The apparatus may, if convenient, be supplied with an electrical heating unit for pre-heating the combustion air.

Moreover, the very powerful pressure and heat-energy may be utilized in a turbine arrangement placed after the apparatus, which turbine may actuate one or more compressors for supplying combustion air and cooling air, or other gaseous mediae, with those earlier mentioned energy-increasing substances, and/or neutralizing substance, to the apparatus.

Reference will now be had to the accompanying drawing, the only FIGURE of which is a vertical sectional view of one form of an apparatus in accordance with the invention.

The apparatus shown consists of a strong cylindrical shell 1 that may be provided with an envelope of thermal insulation material or concrete and which may be placed below ground level. At the top, inside the shell, a plurality of burner nozzles 2 are spaced at regular intervals along a circle, so that the flames from the burner nozzles will merge into an annular flame. For instance, the burner nozzles may be spaced about one foot from each other. The burner nozzles may be adapted to supply oil, gas or other fuel.

Primary air is supplied through channels 3 within the shell 1 and is, together with the fuel issuing from the burner nozzles 2, directed against the lower side of a perforated screen 4 of refractory material which is mounted above the burner nozzles 2. Secondary air is supplied from a channel 6 through a mushroom-shaped hollow body 5 mounted above the screen 4. As described in the aforementioned specification of Danish patent No. 113,942 the various streams of air and fuel flow redially outwards along the screen 4 while interacting with each other through the screen, with the result that an annular flame of very high temperature (about 1,200°C or more) is formed at the circumference of the screen 4.

This flame is deflected downwards through a channel 7 having an annular cross-section. Mounted centrally above the mushroom-shaped body 5 at the top of the apparatus is a nozzle 8 which is adapted to emit a conical stream 9 of a gaseous medium such as pre-heated air or steam having particles of sea water, polluted water, salts, oil, or other substance capable of exothermic reaction under the influence of heat, suspended therein, such stream 9 being directed towards and along the outer circumferential wall of the channel 7 to flow down through the same at the outside of the hot combustion gases flowing therethrough. Under the action of the heat of the combustion gases a chemical reaction of the added substances among themselves, or with the combustion gases, is initiated which may raise the temperature of the gases in the channel 7 to about 3,000°C or more.

Centrally in the apparatus a pipe-line 10 which is vertically adjustable extends up through the mushroom-shaped body 5. Through this pipeline a regulating medium 11, in connection with hot air or steam, may be supplied to the inner side of the conical stream 9 of energy-increasing substances. This regulating medium may serve to neutralize the effect of any poisonous substances among the energy-increasing substances in the conical stream 9, or increase the electrical conductivity (ionization) of the gaseous stream in the channel 7, or simply to regulate the combustion in the combustion chamber; in this case the regulating medium may be cold air or a fluid or steam containing a solid pulverized inflammable material, for instance, coal dust or wood powder. In addition, the regulating medium may be used to generate shock impulses of short duration, to increase the temperature and channel the electrical conductivity of the gaseous stream in the channel 7.

When the apparatus is adapted to operate as a magnetohydrodynamic generator, as for instance in the embodiment shown, the outer wall of the channel 7 includes a powerful magnet 12, and an insulating material is mounted between the magnetic poles in such a way that, together with the magnet, it forms a closed cylindrical element. In the insulating material electrodes are mounted to take out electric current.

The walls may also be constructed of circular magnets with a horseshoe shaped cross-section.

To protect the magnets against the very hot gaseous stream, and also to increase the acceleration of the gaseous stream, a very cold air stream 13 having a temperature around −60°C, for example, is caused to flow along the faces of the magnets between the latter and the very hot gaseous stream.

It will be noted that the very hot cylindrical flame in the channel 7 burns in a downward direction and flows between two air streams having different temperatures, namely, the very cold cooling air that flows along the face of the cylindrical magnet 12, together with the secondary air on the outer side, and the stream of the primary air on the inner side of the flame.

The supply lines for the secondary air and the primary air and also for fuel and regulating medium, extend up through the shell 1 between the inner walls of the channel 7 and the outer wall of a shaft 14 formed inside the apparatus.

The space between the wall of the channel 7 and the outer side of the central shaft 14 is provided with heat insulation in such a way that it is possible to work inside the shaft. The shaft may be provided with a lift 15 by which the fitters that have to attend and inspect the burners can come up to.

The flue gases may flow up along the outer side of the apparatus to the atmosphere or to a device consuming thermal energy. If desired, the flue gases may alternatively be carried off the bottom of the apparatus.

What we claim is:

1. A process for producing energy in the form of heat and pressure by means of a burner of the type including a perforated screen of refractory material, said process comprising the steps of directing a stream of fuel and primary air against one side of said screen, and a stream of secondary air against the opposite side of said screen, the two streams being deflected along said screen to form a substantially annular flame at the circumference thereof, causing the combustion gases from said flame to flow through a channel having a substantially annular cross-section, and introducing a stream of a gaseous medium containing substances for increasing the energy of the combustion into said channel along the outer circumferential wall thereof, said lastnamed stream enveloping the stream of said combustion gases.

2. A process as in claim 1, wherein said substances for increasing the energy of the combustion are sea water.

3. A process as in claim 1, wherein said substances for increasing the energy of the combustion are polluted water.

4. A process as in claim 1, wherein an ionizing substance is added to said gaseous medium.

5. An apparatus for producing energy in the form of heat and pressure, comprising burner means including a perforated screen of refractory material, means for directing a stream of fuel and primary air against one side of said screen, means for directing a stream of secondary air against the opposite side of said screen, the two streams being deflected along said screen to form a substantially annular flame at the circumference thereof, said burner means being mounted at the upper end of a substantially vertical channel having a substantially annular cross-section, the lower end of said channel communicating with a flue, means mounted above said burner means and adapted to introduce a gaseous medium into said channel in the form of a continuous curtain-like stream along the outer circumferential wall of said channel, and means mounted above said burner means and adapted to add substances for increasing the energy of the combustion to said stream of gaseous medium.

6. An apparatus as in claim 5, comprising further means for adding substances for influencing the combustion to said gaseous medium.

7. An apparatus as in claim 5, comprising further a shaft defined within the inner circumferential wall of said channel and containing supply lines to said burner means and providing access to said burner means.

8. A magneto-hydrodynamic generator for producing electric energy from an ionized stream of combustion gases, comprising burner means including a perforated screen of refractory material, means for directing a stream of fuel and primary air against one side of said screen, means for directing a stream of secondary air against the opposite side of said screen, the two streams being deflected along said screen to form substantially annular flame at the circumference thereof, said burner means being mounted at the upper end of a substantially vertical channel having a substantially annular cross-section, the lower end of said channel communicating with a flue, alternate magnet poles, and electrodes in the outer circumferential wall of said channel, said electrodes being connected to an electric circuit, means mounted above said burner means and adapted to introduce a gaseous medium into said channel in the form of a continuous curtain-like stream enveloping the stream of combustion gases issuing from said burner means, means mounted above said burner means and adapted to add substances for increasing the energy of the combustion to said stream of gaseous medium, and means mounted above said burner means for introducing a gaseous cooling medium into said channel in the form of a continuous curtain-like stream along the outer circumferential wall of said channel.

9. An apparatus as in claim 8, comprising further a shaft defined within the inner circumferential wall of said channel and containing supply lines to said burner means and providing access to said burner means.

* * * * *